United States Patent Office 2,965,615
Patented Dec. 20, 1960

2,965,615

POLYURETHANES AND THEIR PREPARATION

Roy W. Tess, Orinda, Calif., assignor to Shell Oil Company, New York, N.Y., a corporation of Delaware No Drawing. Filed Apr. 3, 1958, Ser. No. 726,042

11 Claims. (Cl. 260—77.5)

This invention relates to new resinous materials and their preparation. More particularly, the invention relates to new polyurethane resins prepared from a special type of polyol and to the use of the polyurethanes, particularly in the preparation of coatings and foamed or cellular materials.

Specifically, the invention provides new polyurethane resins having improved properties which comprise the reaction product of an organic polyisocyanate or polyisothiocyanate and a resinous polyol consisting of a copolymer of an ethylenically unsaturated monohydric alcohol and an alkenyl-substituted aromatic compound and/or hydroxy-containing derivatives thereof. The invention further provides improved surface coating compositions and improved foamed or cellular products prepared therefrom.

It is an object of the invention to provide new resinous materials. It is a further object to provide new and improved polyurethane resins which are particularly useful and valuable in industry. It is a further object to provide new polyurethane resins which may be used to form coating compositions having improved solvent resistance. It is a further object to provide new polyurethane coatings having improved resistance to water. It is a further object to provide improved polyurethane foams from special resinous polyols. These and other objects of the invention will be apparent from the following detailed description thereof.

It has now been discovered that these and other objects may be accomplished by the compositions of the invention comprising the reaction product of an organo polyisocyanate or a polyisothiocyanate and a resinous polyol consisting of a copolymer from an ethylenically unsaturated monohydric alcohol and an alkenyl-substituted aromatic compound, and/or hydroxy-containing derivatives thereof. It has been found that the polyurethane resins prepared from the above described special resinous polyols have many unexpected properties which enable them to be utilized for a wider field of application than the conventional polyurethane products. It has been found, for example, that the new polyurethane resins have unexpected resistance to solvents and unexpected resistance to water. The new polyurethanes prepared from the hydroxy-containing derivatives of the resinous copolymers also have surprisingly good flexibility and distensibility. The new polyurethanes have been found to be particularly useful in preparing coatings and in preparing foams for structural applications.

The resinous polyols used in the preparation of the new compositions of the invention comprise the copolymers of ethylenically unsaturated monohydric alcohols and alkenyl-substituted aromatic compounds, and preferably those containing from 15% to 90% by weight of combined alkenyl-substituted aromatic compounds. The ethylenically unsaturated monohydric alcohols include, among others, allyl alcohol, chloroally alcohol, methallyl alcohol, beta-phenylallyl alcohol, and the like. Particularly preferred are the 2-alkenols containing from 3 to 8 carbon atoms.

The alkenyl-substituted aromatic compounds used in preparing the resinous copolymers include, among others, styrene, p-chlorostyrene, alpha-methylstyrene, p-methoxystyrene, p-butylstyrene, p-octylstyrene, vinyl toluene, 2,5-dibutylstyrene, beta-vinyl naphthalene, 2,4-dichlorostyrene and the like. Particularly preferred are styrene, and the nuclear chloro- and alkyl substituted styrene wherein the alkyl groups contain from 1 to 4 carbon atoms.

The resinous polyols are preferably prepared by heating a mixture of the unsaturated alcohol and the alkenyl-substituted aromatic compound at a temperature ranging from about 100° C. to about 250° C. in the presence of from about .1% to about 25% of a peroxide having a decomposition temperature in excess of 90° C., the quantity of the peroxide being based on the weight of the monomers.

The preferred procedure is to add the alkenyl-substituted aromatic compound in small increments during the course of the reaction. The addition is regulated so as to maintain the ratio of unreacted monomers substantially constant and thus permit the formation of a copolymer having uniform composition.

The ratio in which the alcohol and the alkenyl-substituted aromatic compounds may be combined at the beginning of the reaction, and preferably maintained during the course of the reaction, may vary within wide limits. As the monomers differ in the rate of polymerization, ratio of unreacted monomers will differ from the ratio in which the monomers appear in the copolymer and it will be necessary to run a few preliminary determinations to establish the ratio of unreacted monomers needed to give a copolymer of the desired composition. If allyl alcohol and styrene are the monomers and the catalyst is di-tert-butyl peroxide at a temperature of about 120° C., the relation of the ratio of unreacted monomers to finished copolymer composition may be illustrated by the following:

| Allyl alcohol: Styrene, Moles unreacted monomer in Polymerization Mixture | Peroxide, Percent w. of Copolymer | Vinyl Aromatic, Percent w. in Copolymer |
|---|---|---|
| 10:1 | 3.5 | 82 |
| 20:1 | 7.2 | 69 |
| 30:1 | 9.9 | 60 |
| 900:1 | 23:7 | 13 |

The peroxides employed in the polymerization are preferably those that do not decompose below 90° C. Such peroxides include di-tertiary-butyl peroxide, hydrogen peroxide, tertiary-butyl hydroperoxide, cumene hydroperoxide, paramenthane hydroperoxide, tertiary-butyl perbenzoate and the like.

As noted, the peroxide is preferably utilized in an amount varying from .1% to 25% by weight of monomer, and preferably .1% to 10%. The exact amount used will depend on a number of considerations. One important consideration is the proportion of the unsaturated alcohol present as the polymerization proceeds, i.e., with higher concentrations of the alcohol greater amounts of peroxide are required. This in turn is related to the desired composition of the copolymer as described above. Another important consideration is the temperature at which the copolymerization is conducted. As a generalization, it may be stated that at higher temperatures, e.g., the order of 160–180° C., the quantity of the peroxide required is lower; at lower temperatures, i.e., in the order of 120–130° C., the quantity of the peroxide required is greater.

The temperature employed will vary depending upon factors such as desired reaction time, amount of peroxide and the molecular weight of the finished copolymer. In most cases, the temperatures employed will vary from about 100° C. to about 250° C. Temperatures within this range give satisfactory reaction rates, can be used with economical amounts of peroxide catalyst and give products having molecular weights within the desired range, e.g., from about 500 to about 8,000 and preferably between 700 and 3,000. These molecular weights are determined ebullioscopically in dichloroethane.

After the copolymerization is complete, the reaction product may be worked up in any conventional manner to recover the copolymer and remove any unreacted monomer and byproducts. The separation may be accomplished by any means, such as, for example, distillation, extraction and the like.

The preparation of an allyl alcohol styrene copolymer by the above method is shown below:

COPOLYMER A

To a pressure vessel equipped with an agitator, thermometer and suitable fixture for pumping liquids into the vessel under pressure, are charged 11.085 parts (191 moles) of allyl alcohol, 994 parts (9.6 moles) of styrene, stabilized with .005% of tertiary-butyl catechol, and 241.6 parts of ditertiary butyl peroxide. The temperature is raised to 135° C. and maintained at about this temperature for 5 hours. Over the 5 hour period additional styrene is pumped into the reaction vessel so that at the end of the first hour about an additional 700 parts of styrene is added; at the end of the second hour about 490 parts; at the end of the third hour about 344 parts; at the end of the fourth hour about 242 parts; and at the end of the fifth hour about 169 parts. This styrene likewise contains tertiary-butyl catechol stabilizer. After the reaction is complete, the contents of the vessel are distilled to separate the unreacted monomers. The residue, at 23% conversion, is a brittle resin which is substantially colorless. It has a styrene content of about 70%, hydroxyl equivalent of .45/100 g., a molecular weight of about 1300, a softening point (Durrans) of 95° C. and an acidity of less than 0.001 eq./100 g. This polymer will be refererd to hereinafter as Copolymer A.

COPOLYMER B

The above process is repeated with the exception that the mol ratio of allyl alcohol to styrene is changed to about fifty to one. The resulting product is a brittle resin having a styrene content of about 40%, hydroxyl content of 0.750 eq./100 g. This product will be referred to herein as Copolymer B.

COPOLYMER C

The above process is repeated with the exception that the mol ratio of allyl alcohol to styrene is changed to about 10 to 1. The resulting product is a brittle resin having a styrene content of 85% and a hydroxyl value of 0.271 eq./100 g. This product will be referred to as Copolymer C.

COPOLYMER D

To a reaction vessel equipped as above are charged 270 parts of allyl alcohol, 549 parts of para-methylstyrene and 8.2 parts of ditertiary butyl peroxide. The temperature is raised to 185° C. and maintained at this temperature for several hours while the mixture is blanketed with nitrogen. During the first, 3d and 5th hours, respectively, 8.2 parts of ditertiary-butyl peroxide is added. When the reaction is complete the contents of the vessel are distilled at 155° C. at about 1 mm. Hg. The copolymer is a brittle resin having a mol weight of 470, a hydroxyl value of about 0.36 eq./100 g. and an acidity of less than 0.001 eq./100 g.

COPOLYMER E

A para-chlorostyrene-allyl alcohol copolymer is prepared using the same weight relationship as in the preceding example. The product is a clear, brittle solid having a high hydroxyl value.

Modified polymers of the unsaturated alcohol and the alkenyl-substituted aromatic compounds may also be used in making the products of the present invention. This includes further reacting the polymers with alkylene oxides, such as propylene and ethylene oxides, or by including additional unsaturated components in the polymerization reaction medium during the formation of the polymer. In this latter case, the amount of the additional component preferably should not exceed 30% by weight of the copolymer.

The derivatives of these polyols which are particularly useful in making the new polyurethanes are those obtained by further reacting all but two of the OH groups with other components, such as acids, anhydrides, alkylene oxides, other alcohols and the like.

A preferred group of the hydroxy-containing derivatives of the resinous polyols include those obtained by reacting the resinous polyols with alkylene oxides, and preferably those containing 2 to 4 carbon atoms, such as ethylene oxide, propylene oxide and butylene oxide. These are prepared by merely passing the alkylene oxide into the resinous polyol or solution containing the polyol, preferably in the presence of catalyst, such as boron trifluoride complex as boron trifluoride ethyl etherate in amounts preferably varying from about .1% to 5% by weight. The preparation of two alkylene oxide adducts is illustrated below:

ETHYLENE OXIDE-POLYMER A ADDUCT 100 parts of Polymer A as described above was dissolved in chloroform and 1% of boron trifluoride ethyl etherate added thereto. 4 mols of ethylene oxide per hydroxy group in Polymer A was then bubbled into the reaction vessel. The mixture was heated at a temperature of 100° C. for several hours. The resulting product is a very viscous liquid having a hydroxy value of 0.26 eq./100 g.

PROPYLENE OXIDE-POLYMER A ADDUCT 100 parts of Polymer A as described above was dissolved in chloroform and 1% of boron trifluoride ethyl etherate added thereto. 4 mols of propylene oxide per hydroxy group in Polymer A was then introduced into the reaction vessel. The mixture was heated at a temperature of 100° C. for several hours. The resulting product is a very viscous liquid having a hydroxy value of 0.24 eq./100 g.

A preferred group of the hydroxy-containing derivatives of the resinous polyols include the hydroxy-containing polyesters obtained by reacting polybasic acids, such as phthalic acid, terephthalic acid, isophthalic acid, adipic acid, succinic acid, 1,20-eicosanedioic acid, 1,14-tetradecanedioic acid, cyclohexanedicarboxylic acid, tetrachlorophthalic acid, maleic acid, and the like with a large excess of the resinous polyol, preferably in the presence of known esterification catalysts and preferably at temperatures ranging from about 25° C. to 100° C.

The other compound used to prepare the polyurethanes comprise the organic polyisocyanate or polyisothiocyanate. These compounds generally have the formula XCNRNCY wherein X and Y are selected from the group consisting of sulfur and oxygen and R is a divalent organic radical. The organic radical may be aliphatic, cycloaliphatic, aromatic, or heterocyclic and may be saturated or unsaturated. Examples of these compounds include, among others, toluene diisocyanate, 4,4'-diphenyl diisocyanate, 4,4'-diphenylene methane diisocyanate, dianisidine diisocyanate, 1,5-naphthalene diisocyanate, 4,4'-diphenyl ether diisocyanate, p-phenylene diisocyanate, trimethylene diisocyanate, hexamethylene diisocyanate, ethylene diisocyanate, cyclohexylene diisocyanate, octamethylene diisocyanate, pentamethylene diisocyanate, nonmethylene diisocyanate, octodecamethylene diisocyanate, 2-chloropropane diisocyanate, 2,2′-diethyl-ether diisocyanate, 3(dimethylamine)pentane - diisocyanate, tetrachloro-phenylene diisocyanate-1,4. Still other polyisocyanates or polyisothiocyanates that may be used are the higher molecular weight polyisocyanates obtained by reacting polyhydric alcohols, such as alkane and alkene polyols as glycerol, 1,2,6-hexanethanol, 1,5-pentanediol, ethylene glycol, polyethylene glycol, and the like with an excess of any of the above-described isocyanates.

Preferred organic polyisocyanate and polyisothiocyanate comprise the alkenyl diisocyanate and diisothiocyanate, the cycloalkenyl diisocyanate and diisothiocyanate and the aromatic diisocyanate and diisothiocyanate preferably containing not more than 20 carbon atoms and preferably from 2 to 15 carbon atoms, such as, for example, pentamethylene diisocyanate, octamethylene diisocyanate, phenylene diisocyanate, durene diisocyanate, and 4-4′-diphenyldiisocyanate.

It is also desirable in some cases to add monoisocyanates along with the polyisocyanates to modify the properties and/or control molecular weight. Examples of these compounds include benzene monoisocyanate, hexane monoisocyanate, butane monoisocyanate and cyclohexane monoisocyanate.

The reaction between the organic polyisocyanate or polyisothiocyanate and the above described resinous polyols may be carried out in a variety of ways. Reaction is preferably accomplished by merely mixing the two or more reactants together and heating the mixture to its desired temperature.

The proportions in which the reactants may be combined can be varied widely, depending chiefly on the intended applications. If one desires to utilize the product in the formation of coating and impregnating compositions, such as may be air dried or baked, it is generally preferred to employ the reactants in chemically equivalent amounts up to a slight excess, e.g., 1 equivalent excess, of the polyisocyanate or polythioisocyanate. As used herein and in the claims, chemically equivalent amounts refers to the amount needed to furnish one isocyanate group per hydroxyl group. If one desires to first form higher molecular weight products having free isocyanate groups which may be subsequently cured by contact with moisture or other means, it is generally desirable to utilize a large excess of the polyisocyanate or polythioisocyanate. In this latter case, it is generally preferred to combine the polyol and the isocyanate reactant in chemical equivalent ratios varying from about 1:2 to 1:5. Hydroxy-containing higher molecular weight products can be obtained by utilizing the resinous polyol in excess, e.g., 1 to 3 mol excess.

Catalysts may be employed in the reaction as desired. Preferred catalysts include tertiary amines, such as triethylamine, benzyldimethylamine, tributylamine, methyldiethanolamine and the like. These are preferably utilized in amounts varying from about .1% to 5% by weight of the reactants.

The reactions may be accomplished in the presence or absence of diluents. Preferred diluents include the hydrocarbons, such as aliphatic, cycloaliphatic and aromatic hydrocarbons as benzene, toluene, cyclohexane, hexane, heptane and the like, but other diluents, such as methyl isobutyl ketone and diamyl ketone can also be utilized if desired.

The temperature employed in the reaction may also vary over a wide range. If one desires to prepare mixtures for use in making coatings as described above wherein the components are combined in approximately chemical equivalent amounts or with slight excess of the isocyanate reactant, it is preferred to use temperatures which may vary from room temperature or below, e.g., 10° C. to 15° C., up to and including baking at temperatures of 100° C. to 175° C. In this case, the components are preferably combined at or near room temperature, such as temperatures ranging from 15° C. to 25° C. In the preparation of the high molecular weight isocyanate adducts using a large excess of the isocyanate, the reactants may be combined at room temperature or preferably heated say at temperatures ranging from about 40° C. to about 150° C.

It is sometimes advantageous to carry out the reaction under a blanket of inert gas, such as nitrogen carbon dioxide ethane and the like. Atmospheric, superior atmospheric or sub-atmospheric pressures may be employed.

In the preparation of the new products, and preferably in the preparation of those to be used for surface coatings and foams, other materials may be added, such as wetting agents, stabilizers, plasticizers, and the like, as well as other synthetic resins, oils and the like.

The process of the invention can be used to produce a variety of products. When the reactants are used in such proportions as to effect gelation and cross-linking, e.g., when there is a slight deficiency, equivalent amount or slight excess of the polyisocyanate, the process may be used directly to prepare surface coatings, foams, castings and the like. When the reactants are used to form linear type polymeric products can be further reacted, such as with water, other polyols and the like, to form surface coatings, foams and the like.

When used to prepare surface coatings, it is preferred to combine all the desired reactants and other materials in a solvent and then apply this mixture to the desired surface, such as wood, metal, plaster and the like. The coatings may be allowed to air-dry or they may be baked at temperatures say from 100° C. to 200° C. for a short period.

When used to prepare foamed or cellular materials, one may first form a prepolymer and then use this in the preparation of the foam or all the reactants may be combined together. In making the foams, the resinous polyols, polyisocyanate or polythioisocyanate are preferably mixed with water (e.g., .1 to 2% by weight based on the weight of reactants) and preferably an amine catalyst, such as N-ethyl morpholine, dimethyl ethanolamine or methyl diethanolamine, and a surface active or wetting agent, such as dioctyl ester of sodium sulfosuccinic acid. This mixture is then poured into the mold and heated, say to temperatures ranging from about 40° C. to 150° C.

To illustrate the manner in which the invention may be carried out the following examples are given. It is to be understood, however, that the examples are for the purpose of illustration and the invention is not to be regarded as limited to any of the specific conditions or materials recited therein. Unless otherwise indicated, parts disclosed in the examples are parts by weight.

*Example I*

This example illustrates the preparation of a polyurethane from an allyl alcohol-styrene copolymer having an OH value of 0.76 eq./100 g. and a mol wt. of 1300 and toluene diisocyanate.

10.5 parts of the allyl alcohol-styrene copolymer was dissolved in toluene to form a 40% solution. 4.5 parts of toluene diisocyanate were then added.

The toluene solution of polyol-diisocyanate mixture prepared above was spread on tin panels and allowed to air-dry. In 33 minutes the coating was dried hard. The coating had good resistance to solvents (e.g., mineral spirits) and good water resistance (e.g., 1 week in cold water—no effect).

*Example II*

Example I was repeated with the exception that the allyl alcohol-styrene copolymer and the toluene diisocyanate were combined in equivalent ratio of 1:1.5. The resulting toluene solution was spread on tin panels and allowed to air-dry. The coating dried hard in 26 minutes and had good resistance to solvents and cold water.

Example III

Example I was repeated with the exception that the allyl alcohol-styrene copolymer and toluene diisocyanate were combined in an equivalent ratio of 1:2. The resulting toluene solution was spread on tin panels and allowed to air-dry. The coating dried in 38 minutes to form a hard coating having good resistance to solvents and cold water.

Example IV

Example I was repeated with the exception that the allyl alcohol-styrene copolymer and the toluene diisocyanate were combined in an equivalent ratio of 1:3. The resulting toluene solution was spread on tin panels and allowed to air-dry. The coating dried in several hours to form a hard, solvent and water resistant film.

Example V

This example illustrates the preparation of a polyurethane from a propylene oxide adduct of an allyl alcohol-styrene copolymer wherein the adduct has an OH value of 0.24 eq./100 g.

82.9 parts of the propylene oxide was dissolved in toluene to form a 40% solution. 17.1 parts of toluene diisocyanate were then added.

The toluene solution prepared above was spread on tin panels and allowed to air-dry. The coating dried in several hours to form a hard, flexible, resistant coating.

Example VI

This example illustrates the preparation of a polyurethane from an adduct of ethylene oxide and allyl alcohol-styrene copolymer wherein the adduct has a hydroxy value of 0.26 eq./100 g. and toluene diisocyanate.

81.6 parts of the ethylene oxide adduct was dissolved in toluene to form a 60% solution. 18.4 parts of toluene diisocyanate were then added. The mixture slowly increased in viscosity.

The toluene solution prepared above was spread on tin panels and allowed to air-dry. The coating dried in about 1½ hours to form a hard, solvent and water resistant film.

Related results were also obtained by replacing the ethylene oxide adduct with a propylene oxide adduct of the allyl alcohol-styrene copolymer. The resulting cured film had exceptionally good solvent resistance.

Films of the propylene oxide adduct-isocyanate reaction product were baked at 150° C. for 1 hour to form a hard, resistant film.

Example VII

This example illustrates the preparation of a polyurethane resin from Polymer A and hexamethylene diisocyanate.

Polymer A was dissolved in toluene to form a 40% solution. Hexamethylene diisocyanate was then added to the solution to form a mixture having the polyol and isocyanate in an approximate chemically equivalent ratio of about 1:4. This mixture was heated on a water bath for about 1 hour.

The toluene solution of the polyurethane prepared above was spread on tin panels and allowed to dry in air. The coating dried in a short time to form a hard, resistant film.

Example VIII

Examples 1 to 7 are repeated with the exception that the isocyanate is replaced by durene diisocyanate. Related coatings are obtained.

Example IX

Examples 1 to 7 are repeated with the exception that the resinous polyol is Polymer C as described above.

Example X

This example illustrates the preparation of a foam material from a propylene oxide-Polymer A adduct and toluene diisocyanate.

1 equivalent of the propylene oxide adduct prepared as shown above was combined with 3 equivalents of toluene diisocyanate by stirring; an exothermic reaction ensued. The product, after cooling, was mixed with 1.5% water and 0.5 part of an amine catalyst. This mixture was placed in a mold and heated at 25° C. for 2 hours. The resulting product is a cellular product having good strength and resistance to water.

I claim as my invention:

1. A polyurethane resin comprising the product obtained by mixing and reacting an isocyanate of the group consisting of organic polyisocyanates and organic polyisothiocyanates with a resinous polyol comprising a member of the group consisting of (1) copolymers of allyl alcohol and 15% to 90% by weight of an alkenyl-substituted aromatic compound of the group consisting of styrene, p-chlorostyrene, alpha-methylstyrene, p-methoxystyrene, p-butylstyrene, p-octylstyrene, vinyl toluene, 2,5-dibutylstyrene, beta-vinylnaphthalene and 2,4-dichlorostyrene and (2) reaction products of the said copolymers of allyl alcohol and the alkenyl-substituted aromatic compound with up to 30%, based on the weight of the copolymer, of an alkylene oxide of the group consisting of ethylene oxide and propylene oxide, the resinous polyol and the isocyanate being combined in a chemically equivalent ratio varying from 4:1 to 1:4.

2. A composition as in claim 1 wherein the resinous polyol is a copolymer of allyl alcohol and styrene.

3. A composition as in claim 1 wherein the isocyanate is an aromatic diisocyanate.

4. A polyurethane composition comprising a product obtained by mixing and reacting a hydrocarbon diisocyanate containing no more than 20 carbon atoms with a copolymer of allyl alcohol and 15% to 90% by weight of an alkenyl-substituted aromatic compound of the group consisting of styrene, p-chlorostyrene, alpha-methylstyrene, p-methoxystyrene, p-butylstyrene, p-octylstyrene, vinyl toluene, 2,5-dibutylstyrene, beta-vinylnaphthalene and 2,4-dichlorostyrene, the resinous polyol and the isocyanate being combined in chemically equivalent amount varying from 4:1 to 1:4.

5. A composition as in claim 4 wherein the isocyanate is toluene diisocyanate.

6. A composition as in claim 4 wherein the isocyanate is hexamethylene diisocyanate.

7. A composition as in claim 4 wherein the isocyanate is toluene diisothiocyanate.

8. A composition as in claim 4 wherein the resinous polyol is a copolymer of allyl alcohol and styrene containing at least 3 OH groups and having a molecular weight between 300 and 3,000.

9. A composition as in claim 1 wherein the resinous polyol is an adduct of a copolymer of allyl alcohol and styrene and up to 30% by weight of the said copolymer of an alkylene oxide of the group consisting of ethylene oxide and propylene oxide.

10. A process for preparing a polyurethane resin comprising reacting at a temperature between 10° C. and 175° C. an isocyanate of the group consisting of organic polyisocyanate and polyisothiocyanate with a resinous polyol of the group consisting of copolymers of allyl alcohol and 15% to 90% by weight of alkenyl-substituted aromatic compound, of the group consisting of styrene, p-chlorostyrene, alpha-methylstyrene, p-methoxystyrene, p-butylstyrene, p-octylstyrene, vinyltoluene, 2,5-dibutylstyrene, beta-vinylnaphthalene and 2,4-dichlorostyrene and addition products of the said copolymers of allyl alcohol and the alkenyl-substituted aromatic compound with up to 30%, based on the weight of the copolymer, of an alkylene oxide of the group consisting of ethylene oxide and propylene oxide, the resinous polyol and the isocyanate being combined in a chemically equivalent ratio varying from 4:1 to 1:4.

11. A surface coating comprising a solvent solution of a polyurethane obtained by mixing and reacting an organic polyisocyanate with a resinous polyol comprising a copolymer of allyl alcohol and 15% to 90% by weight of an alkenyl-substituted aromatic compound of the group consisting of styrene, p-chlorostyrene, alpha-methylstyrene, p-methoxystyrene, p-butylstyrene, p-octylstyrene, vinyl toluene, 2,5-dibutylstyrene, beta-vinylnaphthalene and 2,4-dichlorostyrene, the resinous polyol and the organic polyisocyanate being combined in a chemically equivalent ratio varying from 4:1 to 1:4.

References Cited in the file of this patent

UNITED STATES PATENTS

| | | |
|---|---|---|
| 2,381,063 | Kung | Aug. 7, 1945 |
| 2,630,430 | Shokal et al. | Mar. 3, 1953 |
| 2,842,519 | Ripley-Duggan | July 8, 1958 |
| 2,894,938 | Chapin et al. | July 14, 1959 |

FOREIGN PATENTS

| | | |
|---|---|---|
| 887,856 | Germany | Aug. 27, 1953 |